US010437001B1

(12) United States Patent
Gifford et al.

(10) Patent No.: US 10,437,001 B1
(45) Date of Patent: Oct. 8, 2019

(54) FIBER OPTIC DROGUE AND CABLE RETRACTION SPOOL

(71) Applicant: Th United States of America as represented by the Secretary of the Navy, Newport, RI (US)

(72) Inventors: Michael M Gifford, Marion, MA (US); Frank S LiVolski, Wakefield, RI (US); Zachary A Whittaker, Warwick, RI (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 16/136,587

(22) Filed: Sep. 20, 2018

(51) Int. Cl.
    *G02B 6/44* (2006.01)
(52) U.S. Cl.
    CPC ................. *G02B 6/4457* (2013.01)
(58) Field of Classification Search
    CPC ...... G02B 6/4457; G02B 6/4458; H01B 7/14; H01B 13/0816; H01B 13/0825; H01B 13/0833; H01B 13/0841; H01B 3/00; H02G 11/02
    USPC .................. 385/135, 147; 174/70 S; 116/27; 114/328; 367/131
    See application file for complete search history.

(56) References Cited

U.S. PATENT DOCUMENTS

| | | | | | |
|---|---|---|---|---|---|
| 3,358,943 | A | * | 12/1967 | Pelson | B65H 75/28 242/118.7 |
| 4,387,863 | A | * | 6/1983 | Edmonston | B65H 75/14 242/118.4 |
| 4,428,645 | A | * | 1/1984 | Korbelak | G02B 6/4457 156/502 |
| 4,901,938 | A | * | 2/1990 | Cantley | B65H 75/44 242/378.1 |
| 4,946,249 | A | * | 8/1990 | Barlow | G02B 6/3806 385/135 |
| 5,163,988 | A | * | 11/1992 | Setaishi | G02B 6/4441 156/158 |
| 5,857,045 | A | * | 1/1999 | Lee | G02B 6/3806 385/135 |
| 5,984,532 | A | * | 11/1999 | Tamaki | G02B 6/3806 385/53 |
| 6,130,982 | A | * | 10/2000 | Diermeier | G02B 6/4446 385/134 |
| 6,484,958 | B1 | * | 11/2002 | Xue | B65H 75/4434 242/378.1 |

(Continued)

*Primary Examiner* — Robert Tavlykaev
(74) *Attorney, Agent, or Firm* — James M. Kasischke; Michael P. Stanley

(57) ABSTRACT

A drogue and mandrel are provided for securing a fiber optic link in which the mandrel has halves with winding knobs on the ends of the mandrel. One half includes pegs for positioning the link with a fiber optic splice between the pegs. The halves attach at the pegs such that the knobs can wind to secure the link on a lined surface of one of the halves. The halves have grooves to protect the link from breaking during winding. A pair of guide tubes and the mandrel including the fiber optic link are positioned in the drogue with the tubes tangent to the mandrel to ensure that there is no obstruction. A second half of the mandrel features arresting teeth that interfaces with recesses threaded winding knobs to prevent unwinding. A circumferential fin assists with inducing drag of the drogue.

5 Claims, 15 Drawing Sheets

(56) References Cited

U.S. PATENT DOCUMENTS

| | | | | |
|---|---|---|---|---|
| 6,533,206 B2* | 3/2003 | Ichinari | ................ | G02B 6/4457 |
| | | | | 242/388.1 |
| 6,580,866 B2* | 6/2003 | Daoud | ................ | G02B 6/4457 |
| | | | | 385/134 |
| 6,807,355 B2* | 10/2004 | Dofher | ................ | G02B 6/4441 |
| | | | | 385/100 |
| 6,915,058 B2* | 7/2005 | Pons | ................ | G01M 11/3109 |
| | | | | 385/135 |
| 7,028,580 B2* | 4/2006 | Brumberger | ............ | F16G 11/12 |
| | | | | 24/134 P |
| 7,116,883 B2* | 10/2006 | Kline | ................ | G02B 6/4457 |
| | | | | 385/135 |
| 7,266,283 B2* | 9/2007 | Kline | ................ | G02B 6/4457 |
| | | | | 242/362 |
| 7,527,534 B1* | 5/2009 | Cheng | ................ | B65H 75/406 |
| | | | | 439/770 |
| 8,248,776 B2* | 8/2012 | Haigh | ................ | B65H 75/4449 |
| | | | | 114/253 |
| 8,270,152 B2* | 9/2012 | Haigh | ................ | B65H 75/4449 |
| | | | | 174/107 |
| 8,417,083 B2* | 4/2013 | Dofher | ................ | G02B 6/504 |
| | | | | 385/136 |
| 2006/0045458 A1* | 3/2006 | Sasaki | ................ | G02B 6/444 |
| | | | | 385/135 |

* cited by examiner

FIBER OPTIC DROGUE AND CABLE RETRACTION SPOOL

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

Field of the Invention

The present invention is a drogue and cable retention spool for retracting and securing excess fiber optic cable between a support vessel and an underwater vehicle.

Description of the Prior Art

It is desirable for deployed underwater vehicles to maintain a hard data link to a support ship. A fiber optic communication link system for a hard data link includes support ship and underwater vehicle fiber optic communication packs within the ship and the underwater vehicle. The communication packs are fusion spliced prior to mission deployment to allow for a connected link during the mission and for a variable length of fiber optics.

The fusion splice is normally the weak point in the fiber optic communication link. Large tension, support ship and underwater vehicle dynamics as well as external forces can result in breaks in the area of the fusion splice. These breaks pose a significant risk to the mission of the communication system.

In order to perform a fusion splice, a length of fiber optic communication cable is fed from the fiber optic communication cable packs of the support ship and the underwater vehicle. Once the fusion splice is complete; it is not possible to re-spool the excess communication cable. Leaving the excess communication cable exposed can cause a significant risk as this exposure can result in breaks in the fiber optic communication link.

Additionally, different support ship and underwater vehicle fiber optic cable packs have different payout tensions that have to be overcome in order to induce payout of the fiber optic communication link. If the payout tensions vary significantly, the tensions can result in an uneven distribution. Therefore, one of the fiber optic link payouts will be expended before the other. This also poses a risk to the communications system since the usable length of the fiber optic communication link is reduced.

SUMMARY OF THE INVENTION

Accordingly, it is a general purpose and primary object of the present invention to provide a device that protects a fusion splice of a fiber optic communication link.

It is a further object of the present invention to provide a device that retracts and secures excess fiber cable after fusion splicing.

In order to attain the objects above, a fiber optic drogue and cable retention spool is provided for an end-to-end fiber optic communication link arrangement to a fairlead of a support ship and to a fairlead of an underwater vehicle.

The cable retention spool is a winding mandrel of connected halves having threaded knobs at longitudinal ends of the mandrel. One of the halves also includes a first peg and a second peg for alignment and attachment of the halves. The halves of the mandrel also have payout grooves designed to protect the fiber optic communication link from breaking during winding.

In use, a first link end and a second link end of a fiber optic communication link are fed thru a first guide tube and a second guide tube. After which, a fusion splice is made. The fiber optic communication link is guided by the first peg and the second peg as positioned in a bottom half of the mandrel with a fusion splice placed to rest on a mandrel surface between the two pegs. The surface is lined with a spongy gasket material to prevent the fiber optic communication link from being crushed after mating the halves of the mandrel.

The first guide tube and the second guide tube are positioned in a first groove and a second groove of a first half of a deployable pod also known as a fiber optic drogue. Next, the winding mandrel with the guided fiber optic cable is inserted into a bottom half of the deployable pod. A top half of the deployable pod is then secured to the bottom half. The top half of the deployable pod features arresting teeth that interface with recesses of the winding knobs to prevent unwinding.

The present invention provides an area for the fusion splice to be safely stored during operation of the support ship and the underwater vehicle. The functionality of the retraction spool or the winding mandrel provides users the opportunity to safely and strategically store any excess fiber payed out during the fusion splicing process.

The deployable pod and the fin structure allows for increased drag and therefore consistent tension of the fiber optic communication link. This increased drag induces payout from the fiber optic cable packs and allows for a more even payout distribution from the support ship and the underwater vehicle.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 1:
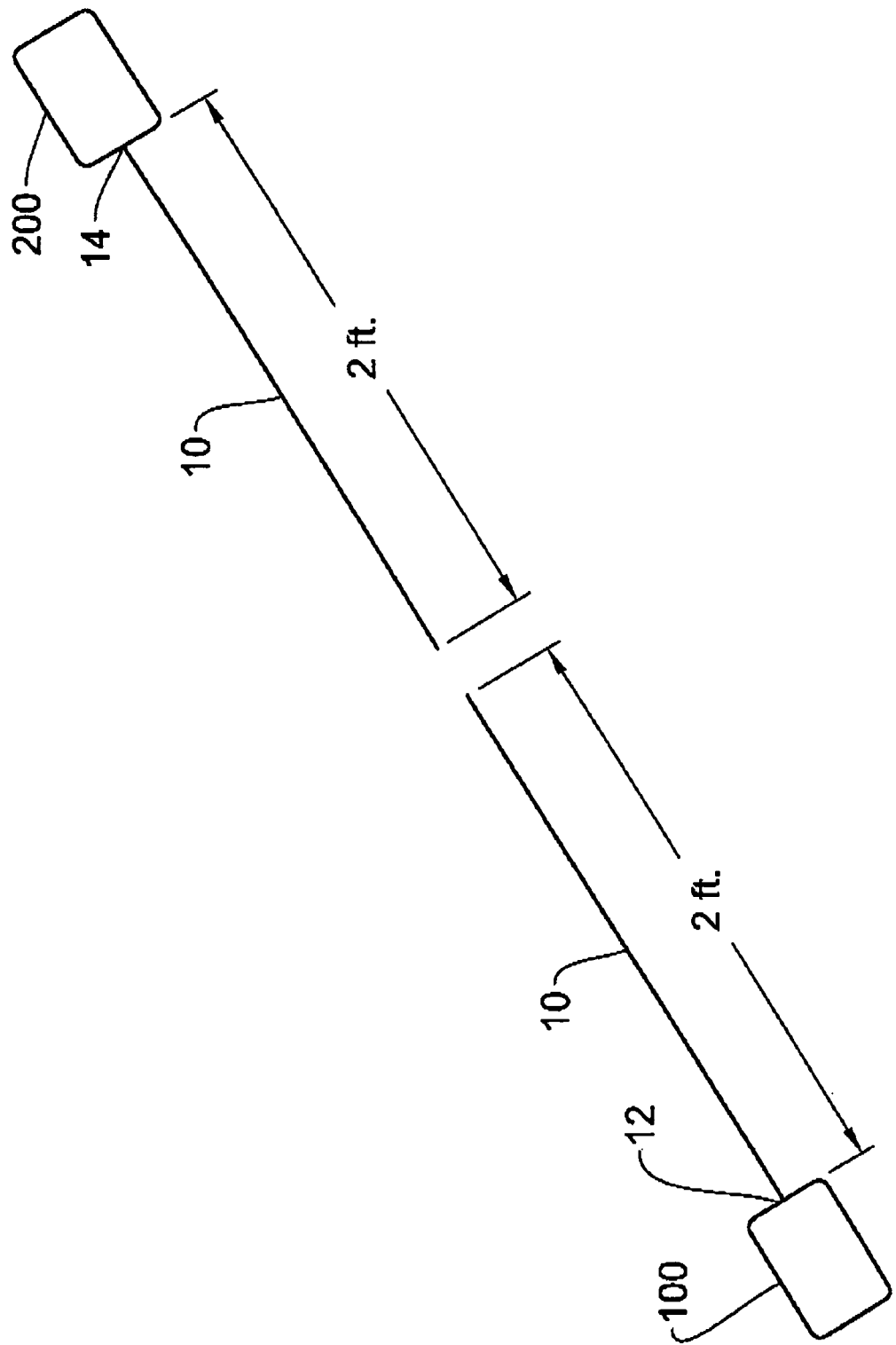
FIG. 1 depicts a fairlead and fiber optic cable arrangement of a support ship and an underwater vehicle.

Referring now to the drawings, and more particularly to FIG. 1 in which an end-to-end arrangement of a fairlead 100 of a support ship and a fairlead 200 of an underwater vehicle are depicted. For a fiber optic communication link 10, a first link end 12 at the support ship fairlead 100 and a second link end 14 at the underwater vehicle fairlead 200 are not yet spliced together. The first end 12 and the second end 14 are paid out by at least two feet to facilitate fusion splicing.

Figure 2:
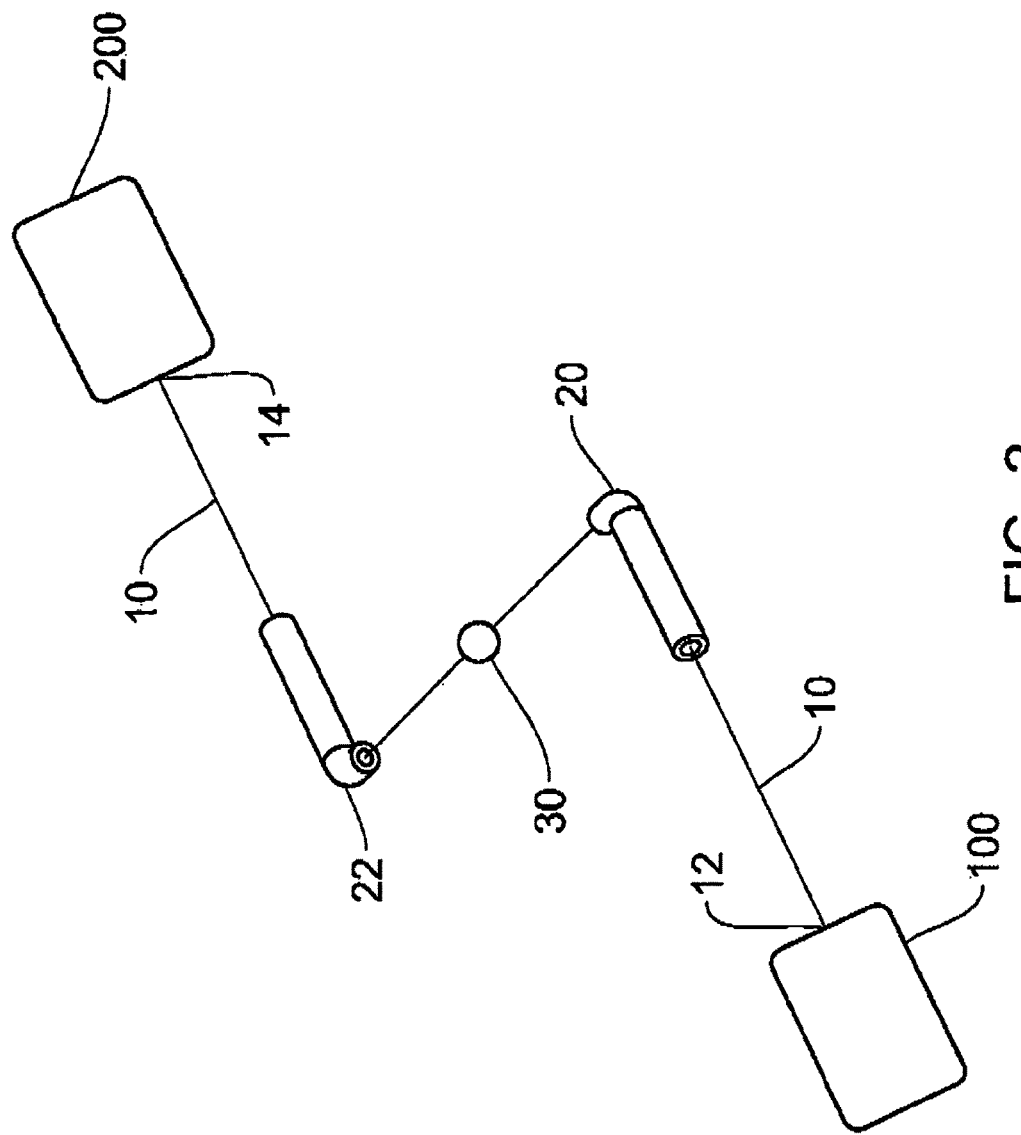
FIG. 2 depicts a first guide tube and a second guide tube used in a fusion splice of a fiber optic communication link.

FIG. 2 depicts a first guide tube 20 and a second guide tube 22 of the fiber optic communication link 10. Prior to fusion splicing, the first link end 12 and the second link end 14 are fed thru the first guide tube 20 and the second guide tube 22, respectively. After which, a fusion splice 30 is made.

Figure 3:
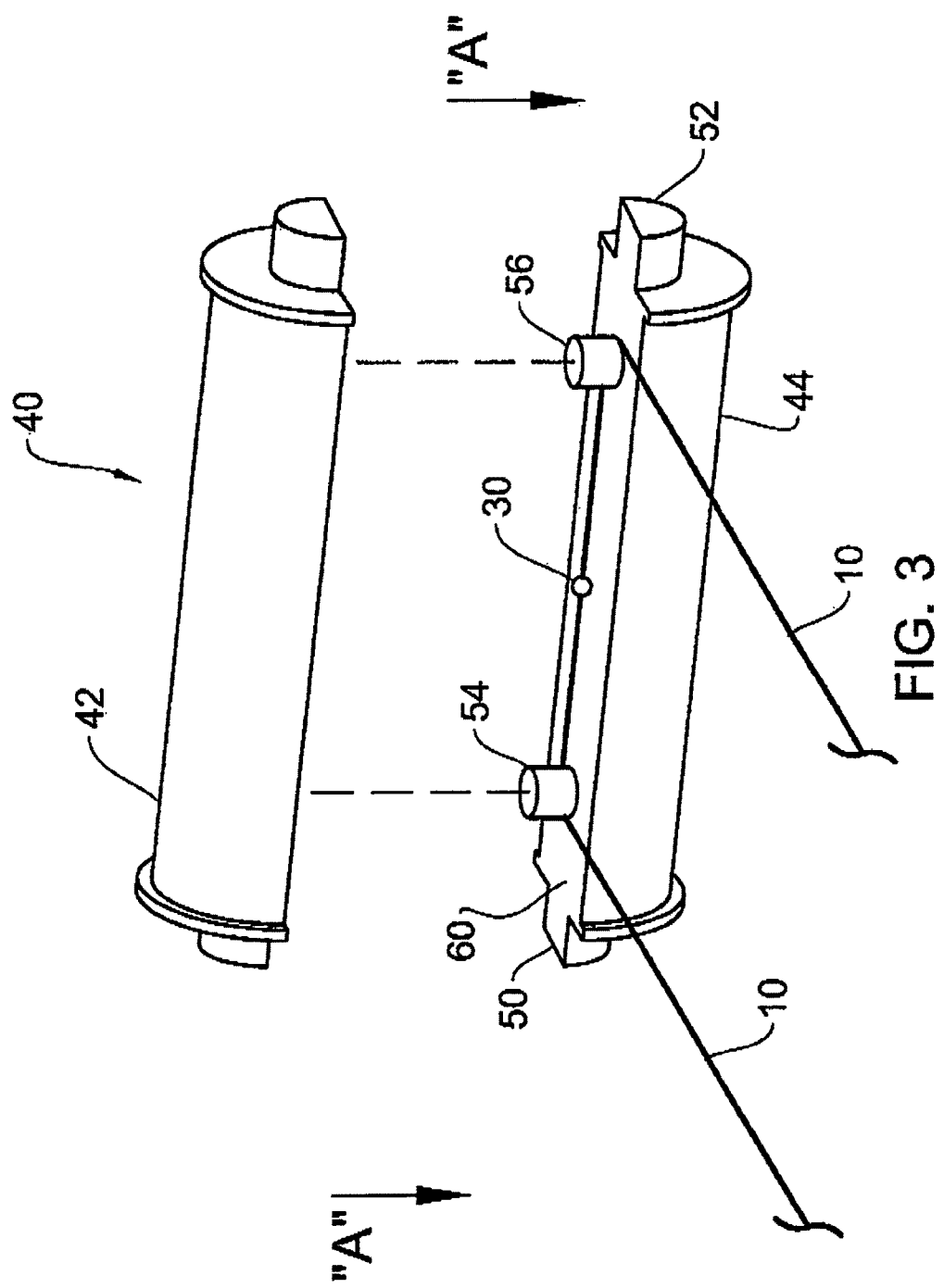
FIG. 3 is an isometric view of a winding mandrel of the present invention with the mandrel disassembled to depict attachment sections of first and second halves of the mandrel.
Figure 4:
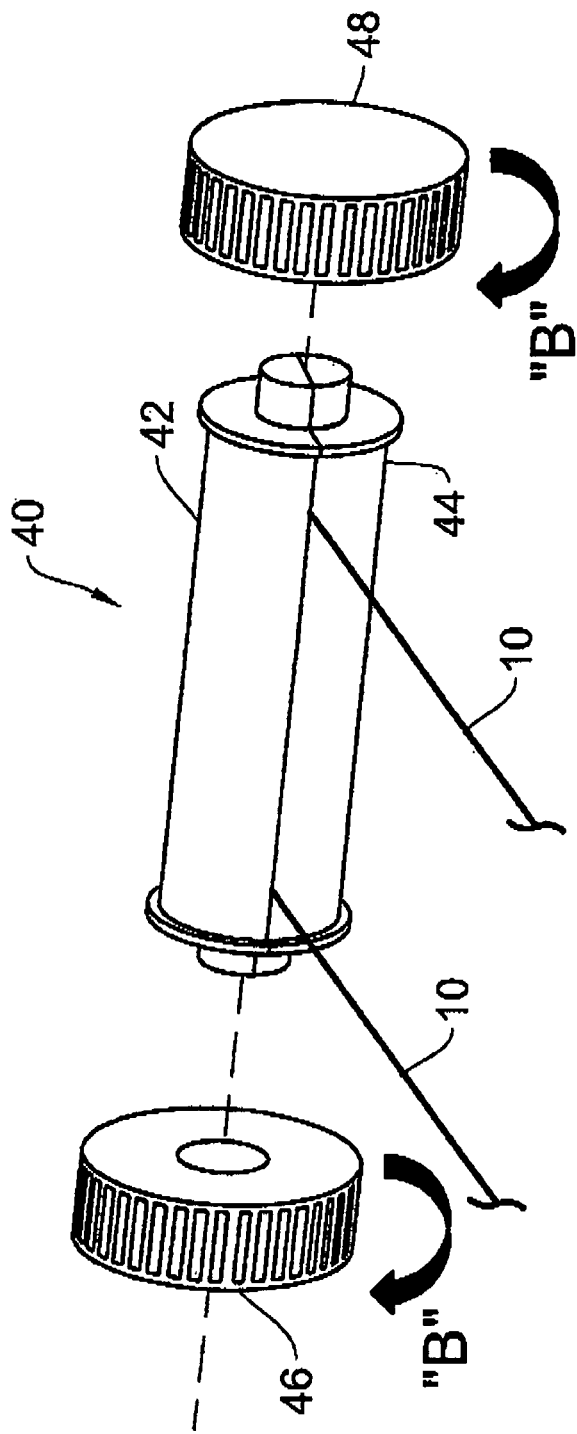
FIG. 4 is an assembly view of the winding mandrel of the present invention with turning knobs of the mandrel disassembled to show attachment points of the turning knobs to the mandrel.

FIG. 3 and FIG. 4 depict a winding mandrel 40 with a first half 42 and a second half 44. The winding mandrel 40 includes a first threaded knob 46 and a second threaded knob 48 affixed respectively on a first protrusion 50 and a second protrusion 52 at longitudinal ends of the mandrel. The second half 44 also includes a first peg 54 and a second peg 56 for positioning of the fiber optic communication link 10.

The first peg 54 and the second peg 56 are additionally used for alignment and attachment of the first half 42 and the second half of the winding mandrel 40 in direction "A". The first peg 54 and the second peg 56 fit into corresponding recesses (not shown) of the first half 42.

Figure 5:
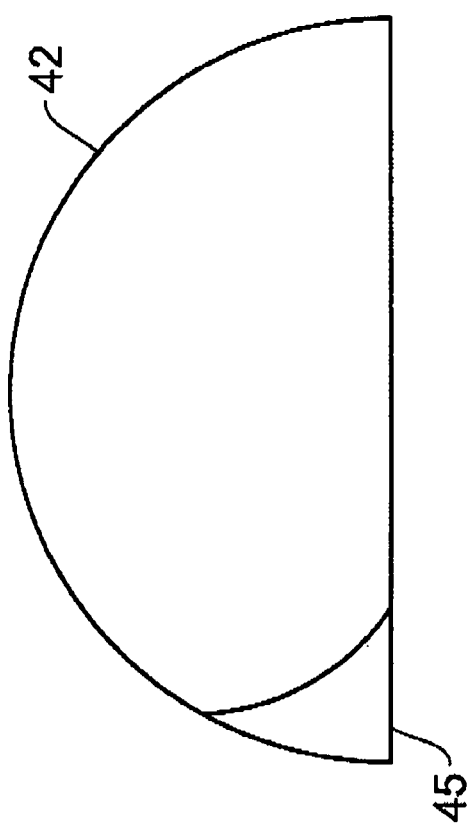
FIG. 5 depicts an end view of the winding mandrel of the present invention to show a payout groove for the fiber optic cable.
Figure 6:
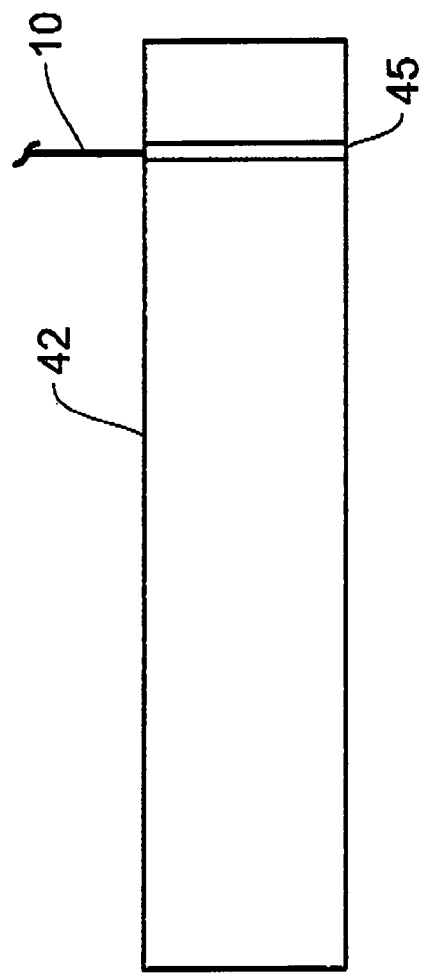
FIG. 6 depicts a longitudinal view of the present invention to show a payout groove for the fiber optic cable.
Figure 7:
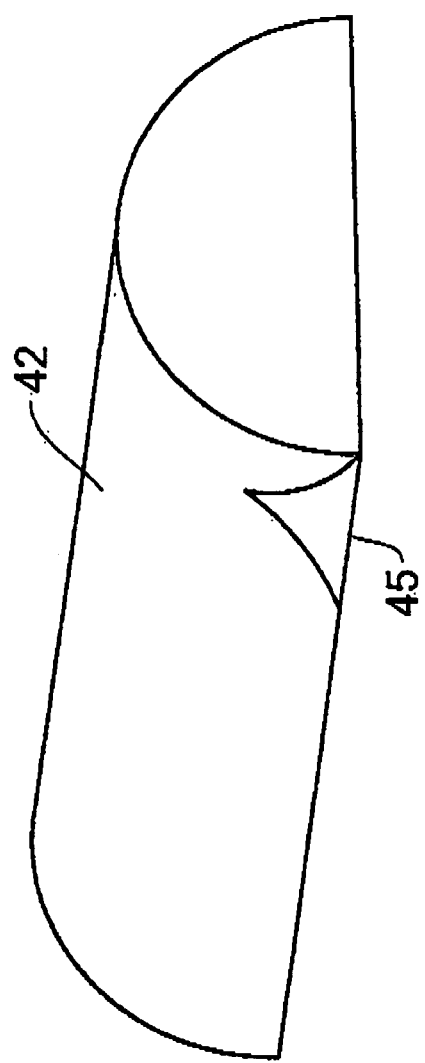
FIG. 7 depicts an isometric view of the present invention to show a payout groove for the fiber optic cable.

As shown in FIG. 5, FIG. 6 and FIG. 7; the first half 42 and the second half 44 of the winding mandrel 40 have payout grooves 45 designed to protect the fiber optic communication link 10 from breaking during winding. The payout groove 45 supports the bend radius of the fiber optic communication link 10 because a sharp corner would either break the communication link or add attenuation to the point where communication would be impossible. The radius of the payout groove 45 could vary from fiber to fiber as a function of the diameter of the communication link 10. The payout groove 45 is on the first half 42 of the winding mandrel 40.

In use and as shown in FIG. 3, the fiber optic communication link 10 is guided by the first peg 54 and the second peg 56 with the fusion splice 30 placed in proximity to the middle of the mandrel 40 to rest on a surface 60. The first half 42 and the second half 44 are then attached in direction "A". The surface 60 of the first half 42, the second half 44 or both are lined with a spongy gasket material to prevent the fiber optic communication link 10 from being crushed after mating the halves of the mandrel 40.

The material and thickness of the gasket material can vary depending on the selected fiber optic communication link 10. For example, a larger diameter communication link could require a marginally thicker gasket material. As best as feasible, a low profile gasket (not shown) will be affixed with an adhesive to the surface 60 of the first half 42 and/or the second half 44 of the mandrel 40.

Figure 8:
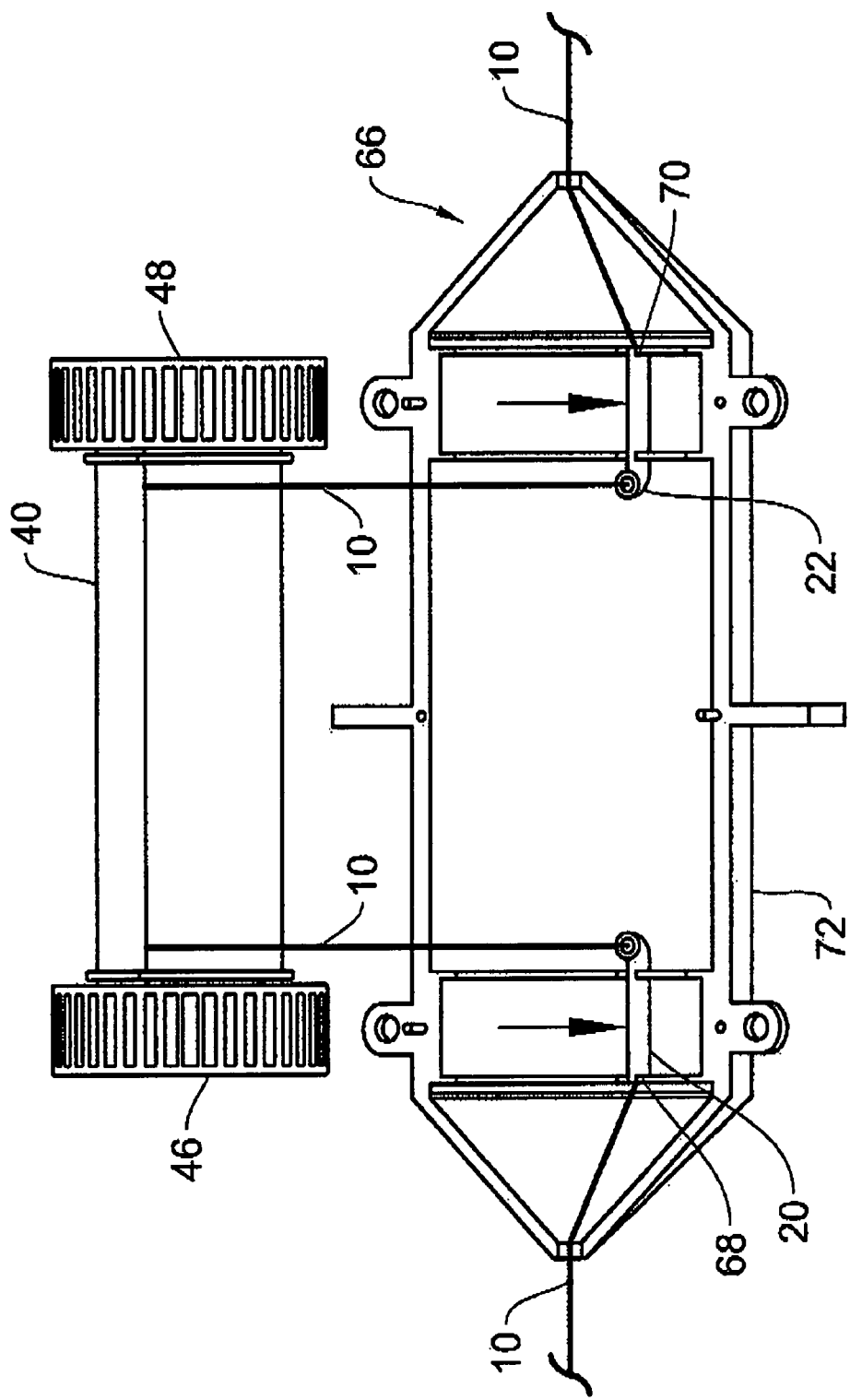
FIG. 8 is an assembly view depicting the insertion of the fiber optic cable onto the winding mandrel and deployable pod of the present invention.

FIG. 8 depicts how the winding mandrel 40 has fiber cable threaded onto the mandrel and a deployable pod 66 of the fiber optic drogue and cable retention spool. The first guide tube 20 and the second guide tube 22 are positioned respectively into a first groove 68 and a second groove 70 of the deployable pod 66. Next, the winding mandrel 40 with the guided fiber optic cable 10 is inserted into a bottom half 72 of the deployable pod 66. The first guide tube 20 and the second guide tube 22 do not face straight up. Instead, the first guide tube 20 and the second guide tube 22 are tangent to the winding mandrel 40 to ensure that there is no obstruction during winding.

Figure 9:
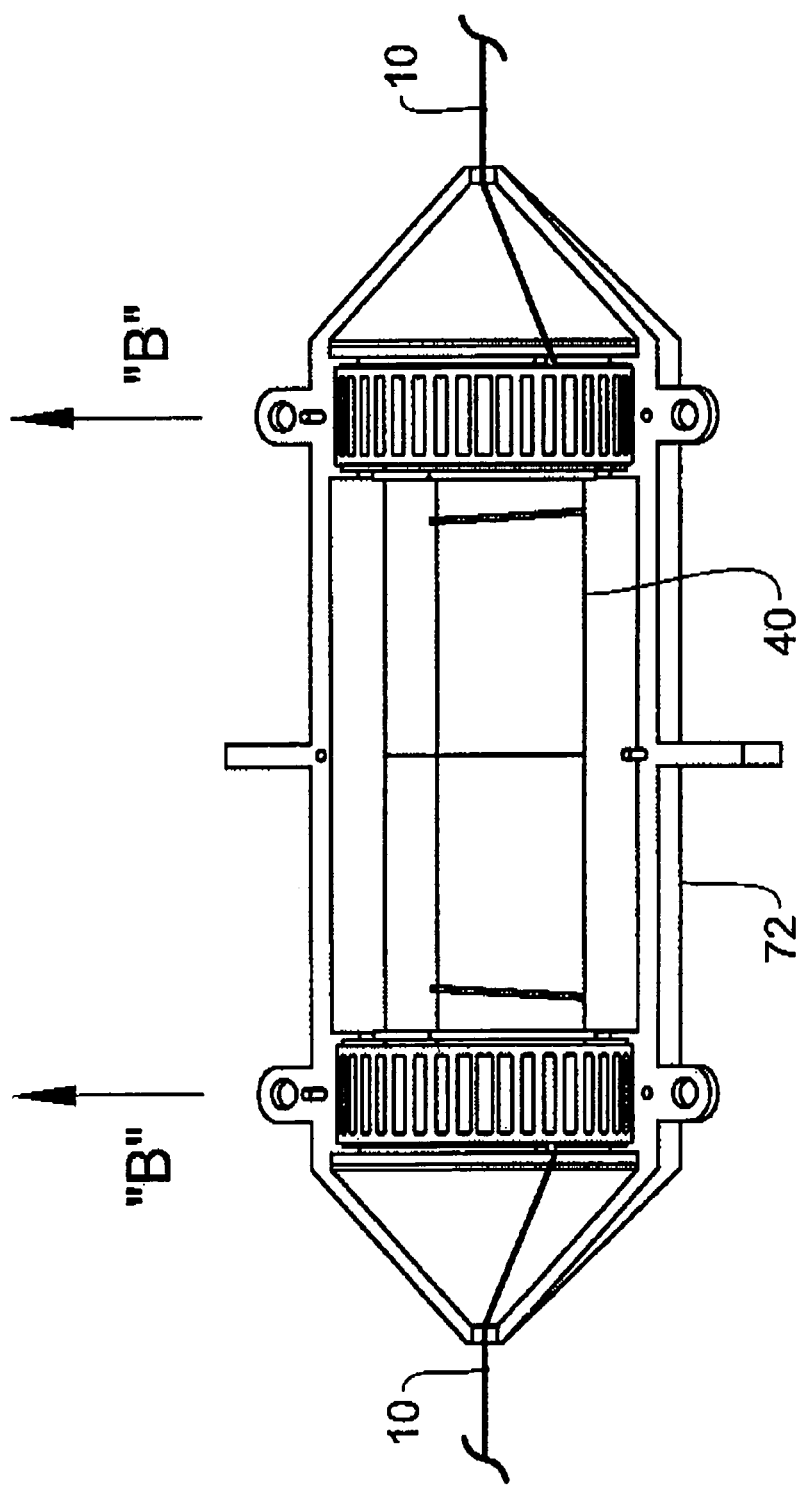
FIG. 9 depicts the winding rotation of the mandrel in the deployable pod wherein excess fiber optic cable is secured within the mandrel.
Figure 10:
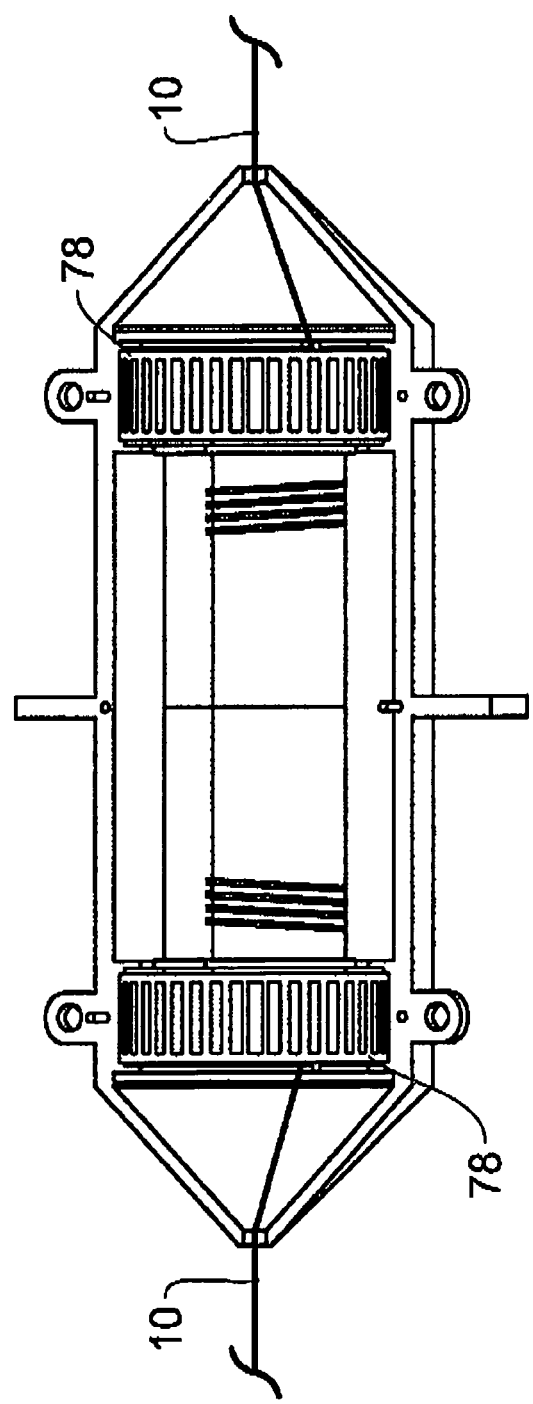
FIG. 10 depicts the fiber optic cable secured within the winding mandrel of the present invention.

FIG. 9 depicts the winding and rotation of the mandrel 40 in direction "B" by which excess of the fiber optic communication link 10 is captured and spooled. FIG. 10 depicts the fiber optic communication 10 spooled in the bottom half 72 of the deployable pod 66.

Figure 11:
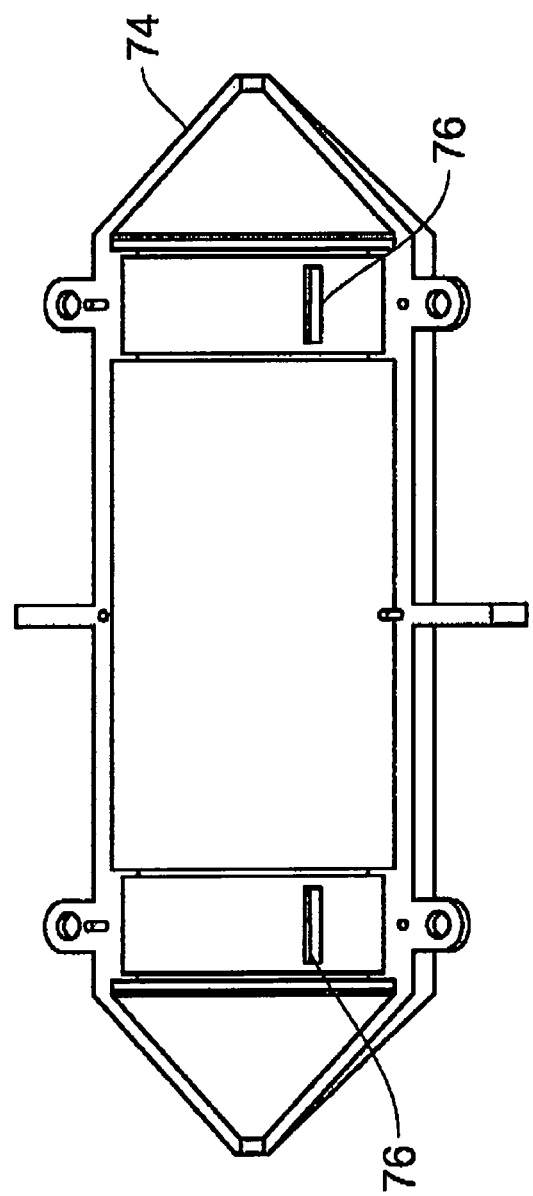
FIG. 11 depicts securing teeth within the top half of the drogue wherein the teeth are capable of mating with the grooves of the knobs of the mandrel.

FIG. 11 depicts a top half 74 of the deployable pod 66 in which the top half features arresting teeth 76 that interfaces with threads or recesses 78 of the first knob 46 and the second knob 48 to prevent unwinding. Once the fusion splice 30 is set and the mandrel 40 is positioned in the deployable pod 66; the mandrel can be rotated and the arresting teeth 76 can prevent unwinding. However, unwinding can occur by simply removing the mandrel 40 from the deployable pod 66 and manually unwinding. Winding would physically occur on the support ship.

Figure 12:
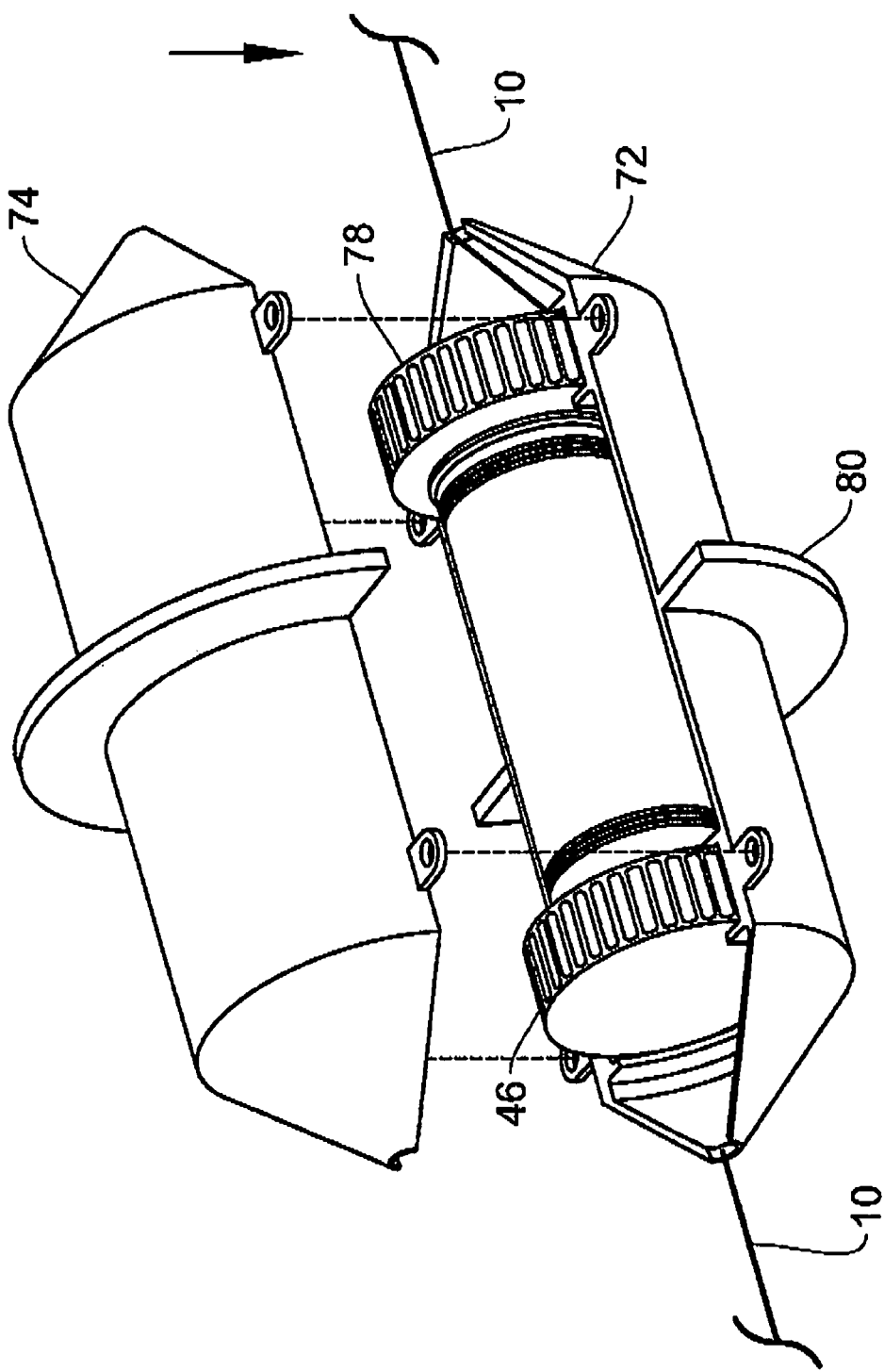
FIG. 12 is an assembly view of the halves of the drogue of the present invention.
Figure 13:
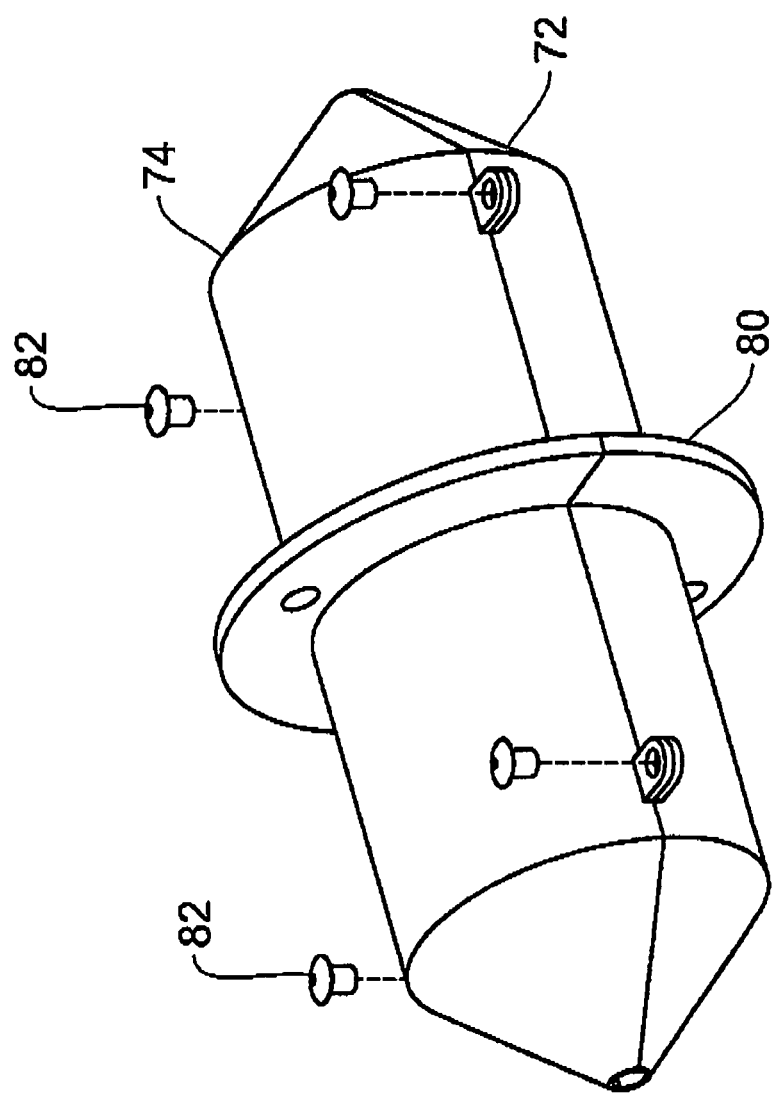
FIG. 13 is an assembly view of the use of attachment screws for the assembly of the drogue of the present invention.

FIG. 12 and FIG. 13 depict the final assembly of the deployable pod 66. A fin structure 80 assists with inducing drag during a payout of the fiber optic communication link 10. Attachment fixtures 82, such as bolts, attach the bottom half 72 and the top half 74 of the deployable pod 66.

The present invention provides an area for the fusion splice 30 to be safely stored during operation of the support ship and the underwater vehicle. The functionality of the retraction spool or the winding mandrel 40 provides users the opportunity to safely and strategically store any excess fiber payed out during the fusion splicing process. The deployable pod 66 and the fin structure 80 allows for increased drag and therefore consistent tension of the fiber optic communication link 10. This induces payout from the fiber optic cable packs and allows for a more even payout distribution from the support ship and the underwater vehicle.

Figure 14:
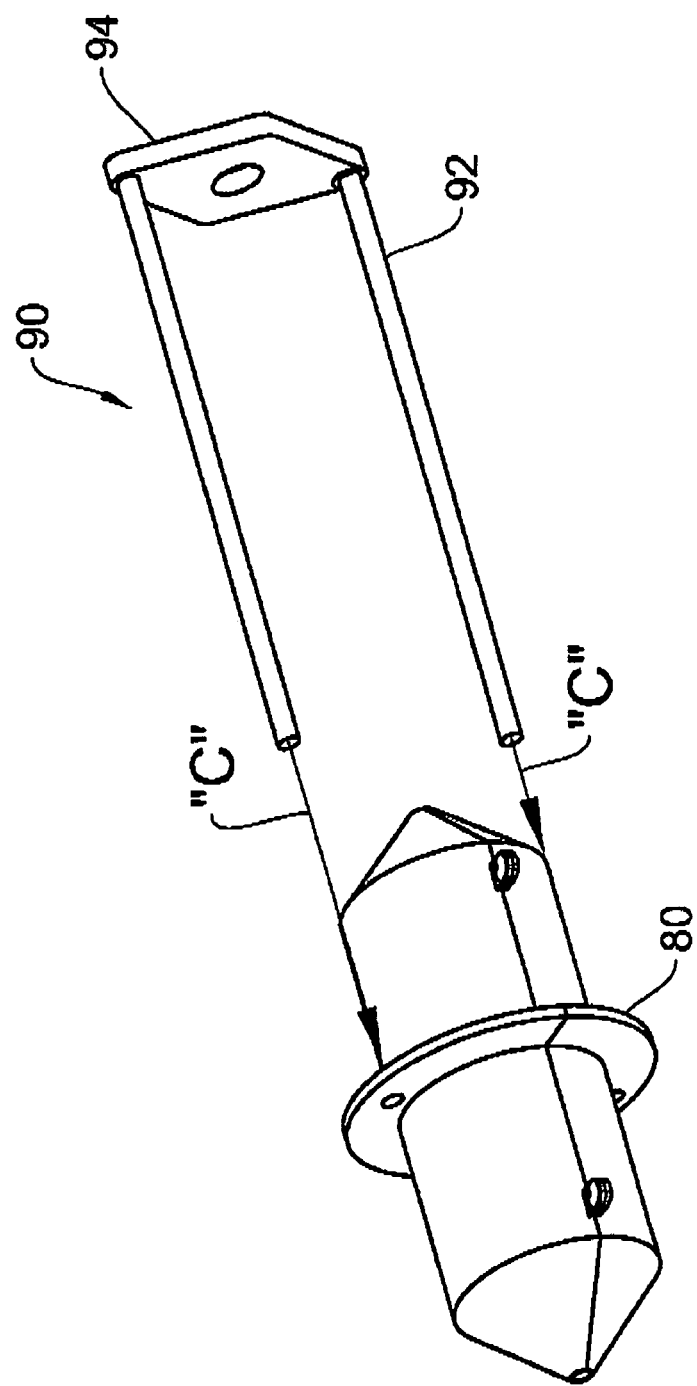
FIG. 14 is an assembly view of the attachment direction for the drogue of the present invention to a supporting ship fairlead.
Figure 15:
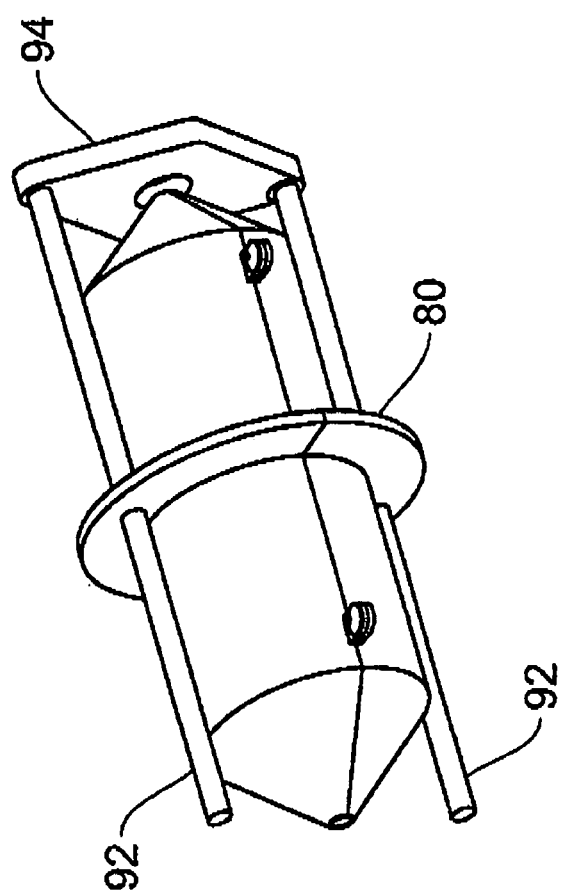
FIG. 15 is an assembly view of the attachment for the drogue of the present invention to the supporting ship fairlead.

FIG. 14 and FIG. 15 depict attachment of the deployable pod 66 to a notional adapter 90 with posts 92 that pass thru apertures in the fin structure 80 in direction "C". The notional adapter 90 has a diamond-shaped mounting plate 94 that can be used to attach to either the support ship fairlead or the underwater vehicle fairlead 200. Two notional adapters 90 can be used for both.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A device for securing a fiber optic communication link, said device comprising:

a mandrel having a first half cylinder shaped section with a first smaller radius half cylinder extending from one end of said first half cylinder shaped section and a second smaller radius half cylinder extending from another end of said first half cylinder shaped section with said first half cylinder shaped section having spaced apart recesses within a flat face, a second half cylinder shaped section with a smaller radius half cylinder extending from one end of said second half cylinder shaped section and a second smaller radius half cylinder extending from another end of said second half cylinder shaped section and with said second half cylinder shaped section having two pegs spaced apart and extending from a flat face of said second half cylinder shaped section to mate with the recesses and capable of accommodating the fiber optic communication link to have a fusion splice of the fiber optic link between said pegs, each half cylinder shaped section connectable to each other at the flat face of each said section, wherein said mandrel is capable of winding the fiber optic communication link with the fiber optic communication link secured between said first half cylinder shaped section and said second half cylinder shaped section; and a deployable pod having a bottom half and a top half with said bottom half having a first groove and a second groove, wherein said deployable pod is capable of having said winding mandrel with the fiber optic link and with the fiber optic link positioned in a first guide tube and a second guide tube inserted into said bottom half of said deployable pod such that the first guide tube and the second guide tube are tangent to the winding mandrel to avoid obstruction for the fiber optic link.

2. The device in accordance with claim 1, said device further comprising a first threaded knob and a second threaded knob affixed on said mandrel when the halves of said mandrel are connected with affixation on the connection of flat faces of each of said smaller radius half cylinders of said first half cylinder shaped section to flat faces of each of said smaller radius half cylinders of said second half cylinder shaped section.

3. The device in accordance with claim 2, said device further comprising a gasket material adhered to a surface of the flat face of said first half cylinder shaped section wherein said gasket material is capable of preventing the fusion splice from being crushed.

4. The device in accordance with claim 3, wherein said top half further comprises arresting teeth capable of interfacing with treads of said first knob and threads of said second knob to prevent unwinding the fiber optic communication link.

5. The device in accordance with claim 4, wherein said deployable pod further comprises a fin structure of a ring encompassing a circumference of said deployable pod wherein said fin structure allows for increased drag and is therefore capable of maintaining consistent tension of the fiber optic communication link.

* * * * *

UNITED STATES PATENT AND TRADEMARK OFFICE
CERTIFICATE OF CORRECTION

PATENT NO.       : 10,437,001 B1
APPLICATION NO.  : 16/136587
DATED            : October 8, 2019
INVENTOR(S)      : Gifford et al.

It is certified that error appears in the above-identified patent and that said Letters Patent is hereby corrected as shown below:

On the Title Page

Item (71), change "Th" to --The--.

Item (72), change "Frank S LiVolski" to --Frank S. LiVolsi--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*